US010944306B2

(12) United States Patent
Takeuchi et al.

(10) Patent No.: US 10,944,306 B2
(45) Date of Patent: Mar. 9, 2021

(54) ROTARY ELECTRIC ROTOR AND METHOD OF MANUFACTURING ROTARY ELECTRIC ROTOR

(71) Applicant: TOYOTA JIDOSHA KABUSHIKI KAISHA, Toyota (JP)

(72) Inventors: Yushi Takeuchi, Nagakute (JP); Shingo Fubuki, Nisshin (JP); Yasuo Kinoshita, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 15/696,786

(22) Filed: Sep. 6, 2017

(65) Prior Publication Data

US 2018/0069450 A1  Mar. 8, 2018

(30) Foreign Application Priority Data

Sep. 8, 2016  (JP) .............................. JP2016-175126

(51) Int. Cl.
*H02K 7/00* (2006.01)
*H02K 15/02* (2006.01)
(Continued)

(52) U.S. Cl.
CPC ............... *H02K 7/003* (2013.01); *H02K 1/22* (2013.01); *H02K 1/30* (2013.01); *H02K 15/02* (2013.01)

(58) Field of Classification Search
CPC ........... H02K 7/003; H02K 1/30; H02K 1/22; H02K 15/02; H02K 7/14; H02K 1/28; H02K 15/028
(Continued)

(56) References Cited

U.S. PATENT DOCUMENTS 4,300,387 A * 11/1981 Okano .................... G01M 1/02
73/460
5,022,823 A    6/1991 Edelmayer
(Continued)

FOREIGN PATENT DOCUMENTS

DE    4239754    *  2/1994
DE    4331803 A1    3/1995
(Continued)

OTHER PUBLICATIONS

Received STIC search report for claim 12 from EIC 2800 searcher Samir Patel on Jul. 10, 2019. (Year: 2019).*
(Continued)

*Primary Examiner* — Shawki S Ismail
*Assistant Examiner* — Htet Z Kyaw
(74) *Attorney, Agent, or Firm* — Sughrue Mion, PLLC

(57) ABSTRACT

A rotary electric rotor includes a rotor core having a shaft through-hole; a rotor shaft having a male screw portion on its first side; a washer having an annular structure with cutouts elastically deformable in a radial direction, having a washer tapered surface, and having an annular projection portion that extends in an axial direction from an end surface and is fixed to the rotor core in a state of being disposed in a gap between an inner circumferential surface of the shaft through-hole and an outer circumferential surface of the rotor shaft and pressing the inner circumferential surface of the shaft through-hole, the end surface and the washer tapered surface are opposite surfaces of the washer; and a nut having a female screw portion that meshes with the male screw portion and having a nut tapered surface that faces the washer tapered surface.

10 Claims, 11 Drawing Sheets

(51) Int. Cl.
*H02K 1/22* (2006.01)
*H02K 1/30* (2006.01)

(58) Field of Classification Search
USPC ............. 310/75 R, 156.08, 156.09, 156.11, 310/156.12, 156.13, 156.14, 156.18, 61; 74/441
See application file for complete search history.

(56) References Cited

U.S. PATENT DOCUMENTS

| | | | | |
|---|---|---|---|---|
| 5,237,737 A * | 8/1993 | Zigler | ............ | H01F 41/0253 |
| | | | | 156/297 |
| 5,574,323 A | 11/1996 | Nusser | | |
| 5,606,212 A | 2/1997 | Sasa et al. | | |
| 2009/0096298 A1* | 4/2009 | Utsumi | ............ | H02K 7/003 |
| | | | | 310/49.07 |
| 2009/0169328 A1* | 7/2009 | Suzuki | ............ | F16B 39/025 |
| | | | | 411/277 |
| 2009/0238505 A1* | 9/2009 | Jameson | ............ | F16H 41/24 |
| | | | | 384/123 |
| 2012/0125163 A1* | 5/2012 | Miyata | ............ | B25B 13/06 |
| | | | | 81/124.5 |
| 2015/0026966 A1* | 1/2015 | Fang | ............ | H02K 1/276 |
| | | | | 29/598 |
| 2017/0047827 A1* | 2/2017 | Fubuki | ............ | H02K 1/28 |
| 2017/0179798 A1* | 6/2017 | Masai | ............ | H02K 15/08 |
| 2019/0186622 A1* | 6/2019 | Ishikawa | ............ | F16H 57/021 |

FOREIGN PATENT DOCUMENTS

| | | |
|---|---|---|
| EP | 1422428 A1 | 5/2004 |
| GB | 898164 A | 6/1962 |
| JP | 63-077442 U | 5/1988 |
| JP | 6425854 U | 2/1989 |
| JP | 2004-129500 A | 4/2004 |
| JP | 2015-122873 A | 7/2015 |
| KR | 10-2014-0078209 A | 6/2014 |
| WO | 03093692 A1 | 11/2003 |

OTHER PUBLICATIONS

Received STIC search report for claims 1 and 8 from EIC 2800 searcher Samir Patel on Jun. 11, 2019. (Year: 2019).*
Translated version of foreign patent DE4239754 (Feb. 1994) from ESpacenet.*
Communication dated Jan. 9, 2020 from the Intellectual Property India Patent Office in application No. 201714031089.

* cited by examiner

ROTARY ELECTRIC ROTOR AND METHOD OF MANUFACTURING ROTARY ELECTRIC ROTOR

INCORPORATION BY REFERENCE

The disclosure of Japanese Patent Application No. 2016-175126 filed on Sep. 8, 2016 including the specification, drawings and abstract is incorporated herein by reference in its entirety.

BACKGROUND

1. Technical Field

The disclosure relates to a rotary electric rotor and a method of manufacturing a rotary electric rotor, and particularly relates to a rotary electric rotor in which a rotor shaft and a rotor core are fixed to each other by using a nut, and a method of manufacturing a rotary electric rotor.

2. Description of Related Art

A rotary electric rotor is formed by assembling a rotor shaft and a rotor core together. If there is a clearance between the rotor shaft and the rotor core, the rotor core comes loose from the rotor shaft. Consequently, nut fastening, wedge inserting, and the like are performed.

Japanese Unexamined Patent Application Publication No. 2015-122873 (JP 2015-122873 A) discloses an electric automobile motor for travelling having a structure restraining looseness of a nut that fixes the rotor core. In the structure, a part of an electromagnetic steel plate of the rotor core is bent so as to protrude to the nut side and to serve as a lug portion, and the nut is provided with an inclined surface such that the inclined surface engages with the lug portion.

Japanese Unexamined Utility Model Application Publication No. 63-77442 (JP 63-77442 U) discloses a configuration of a rotary electric machine in which a ring-shaped wedge having a tapered longitudinal section is coaxially inserted between a rotating shaft and a rotor core, and fastening and fixing are performed by using a locking nut.

As an example of an assembling method in which a clearance between a rotor shaft and a rotor core is eliminated, there is warm assembling in which a clearance is made between the rotor shaft and the rotor core in a high temperature state and the clearance is eliminated by lowering the temperature. A heating device for achieving a warm state is incidental to the warm assembling. In addition, there is a need to perform size management for fitting. Japanese Unexamined Patent Application Publication No. 2004-129500 (JP 2004-129500 A) discloses a technology in which a clearance fitting is employed for fitting, a rotor shaft is inserted into a rotor core at a normal temperature, and the rotor shaft and the rotor core are joined together by performing welding.

SUMMARY

The heating device and the like are incidental to the warm assembling, which also takes time to be processed. If a wedge is used in order to assemble the rotor shaft and the rotor core together at a normal temperature, there is a possibility of damage and the like to the rotor core. In simple nut fastening, a nut may come loose due to centrifugal force or the like generated when a rotor rotates. Thus, there are the demands for a rotary electric rotor that allows the rotor shaft and the rotor core to be assembled together at a normal temperature, and a method of manufacturing a rotary electric rotor.

An aspect of the disclosure relates to a rotary electric rotor including a rotor shaft, a rotor core, a washer, and a nut. The rotor shaft has a male screw portion on a first side in the axial direction of the rotor shaft and has a core receiving portion on a second side in the axial direction of the rotor shaft. The rotor core has a shaft through-hole for the rotor shaft. The rotor shaft is inserted into the shaft through-hole of the rotor core. One end portion of the rotor core is in contact with the core receiving portion of the rotor shaft. The washer has an annular structure. The washer has cutouts configured to cause the washer to be elastically deformable in a radial direction. The washer is disposed so as to be in contact with a second end surface of the rotor core. A surface on the opposite side of a surface of the washer in contact with the second end surface of the rotor core is a tapered surface of which a side disposed radially outward from the rotor shaft is configured to be farther from the second end surface of the rotor core than a side disposed radially inward to the rotor shaft. The surface of the washer in contact with the second end surface of the rotor core has an annular projection portion extending in the axial direction of the rotor shaft. The annular projection portion is positioned in a gap between an inner circumferential surface of the shaft through-hole of the rotor core and an outer circumferential surface of the rotor shaft. The annular projection portion is fitted and fixed to the inner circumferential surface of the shaft through-hole of the rotor core. The nut has a female screw portion, meshes with and is fixed to the male screw portion of the rotor shaft, and has a first end surface in contact with the tapered surface of the washer. The first end surface of the nut is a tapered surface of which a side disposed radially inward to the rotor shaft protrudes closer to the washer side than a side disposed radially outward from the rotor shaft.

With the configuration, the washer having the annular structure with the cutouts configured to cause the washer to be elastically deformable in the radial direction, and the nut having the nut tapered surface that faces the washer tapered surface are used. The annular projection portion of the washer is fixed to the rotor core in a state of being disposed in the gap between the inner circumferential surface of the shaft through-hole of the rotor core and the outer circumferential surface of the rotor shaft and pressing the inner circumferential surface of the shaft through-hole. The nut is fixed to the rotor shaft by performing screw fastening. Accordingly, the rotor shaft and the rotor core can be assembled together.

In the rotary electric rotor according to the disclosure, the inner diameter of the rotor core may be greater than the outer diameter of the rotor shaft. With the configuration, the rotor shaft can be inserted into the rotor core at a normal temperature without employing warm assembling to which a heating device and the like are incidental and which takes time to be processed.

In the rotary electric rotor according to the disclosure, the annular structure of the washer may be a split structure of which a part in a circumferential direction is cut out from an inner circumferential end to an outer circumferential end. With the configuration, since the annular structure of the washer has the cutouts of the split structure, force for reducing the washer is radially applied, so that it is easy to cause the annular projection portion of the washer to be elastically deformed and to be disposed in the gap between the inner circumferential surface of the shaft through-hole of the rotor core and the outer circumferential surface of a shaft portion of the rotor shaft.

In the rotary electric rotor according to the disclosure, the annular structure of the washer may be a partial cutout structure of which a part in the circumferential direction is partially cut out in the radial direction such that the washer is continuous in the circumferential direction. Compared to the split structure, the partial cutout structure having the above-described configuration has high rigidity related to elastic deformation in the radial direction. Therefore, force of the annular projection portion of the washer pressing the inner circumferential surface of the shaft through-hole, that is, force of fixing the washer and the rotor core together can increase compared to the force in the split structure.

In the rotary electric rotor according to the disclosure, the radial thickness of the annular projection portion may be uniform along the axial direction of the rotor shaft. With the configuration, since the annular projection portion is not a wedge type, there is no possibility of damage and the like to the rotor core.

In the rotary electric rotor according to the disclosure, the rotor core may have locating portions respectively matching the cutouts in the annular projection portion of the washer and protruding radially inward from the inner circumferential surface of the shaft through-hole. With the configuration, the washer and the nut are prevented from corotating while the nut is fastened to the rotor shaft.

In the rotary electric rotor according to the disclosure, the tapered surface of the washer may be set such that the greater centrifugal force, the smaller range for being farther from the second end surface of the rotor core in accordance with the specification of the centrifugal force generated in the rotor core when the rotor shaft rotationally operates. With the configuration, since the washer tapered surface and the nut tapered surface can be set in accordance with the specification of the centrifugal force generated in the rotor core, the nut can be restrained from being loosened due to the centrifugal force.

Another aspect of the disclosure relates to a method of manufacturing a rotary electric rotor. The method includes a step of inserting a rotor shaft, a step of disposing a washer, and a step of fastening a nut. In the step of inserting a rotor shaft, the rotor shaft having a male screw portion on a first side in an axial direction of the rotor shaft and having a core receiving portion on a second side in the axial direction of the rotor shaft is inserted into a shaft through-hole of a rotor core from the first side in the axial direction of the rotor shaft, and one end portion of the rotor core is received by the core receiving portion of the rotor shaft. In the step of disposing a washer, an annular projection portion of the washer is disposed in a gap between an inner circumferential surface of the shaft through-hole and an outer circumferential surface of the rotor shaft on a second end surface of the rotor core. The washer has an annular structure. The washer has cutouts configured to cause the washer to be elastically deformable in a radial direction. The annular projection portion of the washer extends in the axial direction of the rotor shaft from a surface in contact with the second end surface of the rotor core. A surface on the opposite side of a surface of the washer in contact with the second end surface of the rotor core is a tapered surface of which a side disposed radially outward from the rotor shaft is configured to be farther from the second end surface of the rotor core than a side disposed radially inward to the rotor shaft. In the step of fastening a nut, the nut is used. The nut has a female screw portion matching the male screw portion of the rotor shaft. An end surface of the nut facing the tapered surface of the washer is a tapered surface of which a side disposed radially inward to the rotor shaft protrudes closer to the washer side than a side disposed radially outward from the rotor shaft. The female screw portion of the nut meshes with the male screw portion of the rotor shaft. The tapered surface of the nut is pressed to the tapered surface of the washer such that the annular projection portion of the washer is widened in an outer circumferential direction. The annular projection portion of the washer is pressed to the inner circumferential surface of the rotor core. The washer is fixed to the rotor core with the nut.

With the configuration, the annular projection portion of the washer having the annular structure with the cutouts configured to cause the washer to be elastically deformable in the radial direction is disposed in the gap between the inner circumferential surface of the shaft through-hole of the rotor core and the outer circumferential surface of the rotor shaft. The end surface of the nut facing the washer tapered surface is the nut tapered surface having a predetermined inclination angle. The nut having the female screw portion meshes with the male screw portion of the rotor shaft, so that the nut and the rotor shaft are fastened together. Accordingly, the nut is fixed to the rotor shaft. The nut tapered surface presses the washer tapered surface. The annular projection portion of the washer is widened in the outer circumferential direction. The annular projection portion presses the inner circumferential surface of the rotor core. The washer is fixed to the rotor core with the nut. In this manner, the rotor shaft and the rotor core are assembled together by using the washer that has the annular projection portion, and the nut.

In the method of manufacturing a rotary electric rotor according to the disclosure, the step of inserting a rotor shaft may be performed at a normal temperature. With the configuration, since the process can be performed at a normal temperature from the stage of inserting the rotor shaft, there is no need to employ warm assembling to which a heating device and the like are incidental and which takes time to be processed.

In the method of manufacturing a rotary electric rotor according to the disclosure, in the step of disposing a washer, the washer is reduced radially inward such that the annular projection portion is reduced radially inward, and then, the annular projection portion may be disposed in the gap between the inner circumferential surface of the shaft through-hole of the rotor core and the outer circumferential surface of the rotor shaft. With the configuration, the annular projection portion can be easily disposed without employing warm assembling to which a heating device and the like are incidental and which takes time to be processed.

According to the disclosure, the rotary electric rotor and the method of manufacturing a rotary electric rotor allows the rotor shaft and the rotor core to be assembled together at a normal temperature.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment will be described in detail by using the drawings. The sizes, the shapes, the materials, and the like described below are examples for description and can be suitably changed depending on specification or the like of a rotary electric rotor. In addition, hereinafter, the same reference signs will be applied to similar elements in all of the drawings, and the description will not be repeated.

Figure 1:
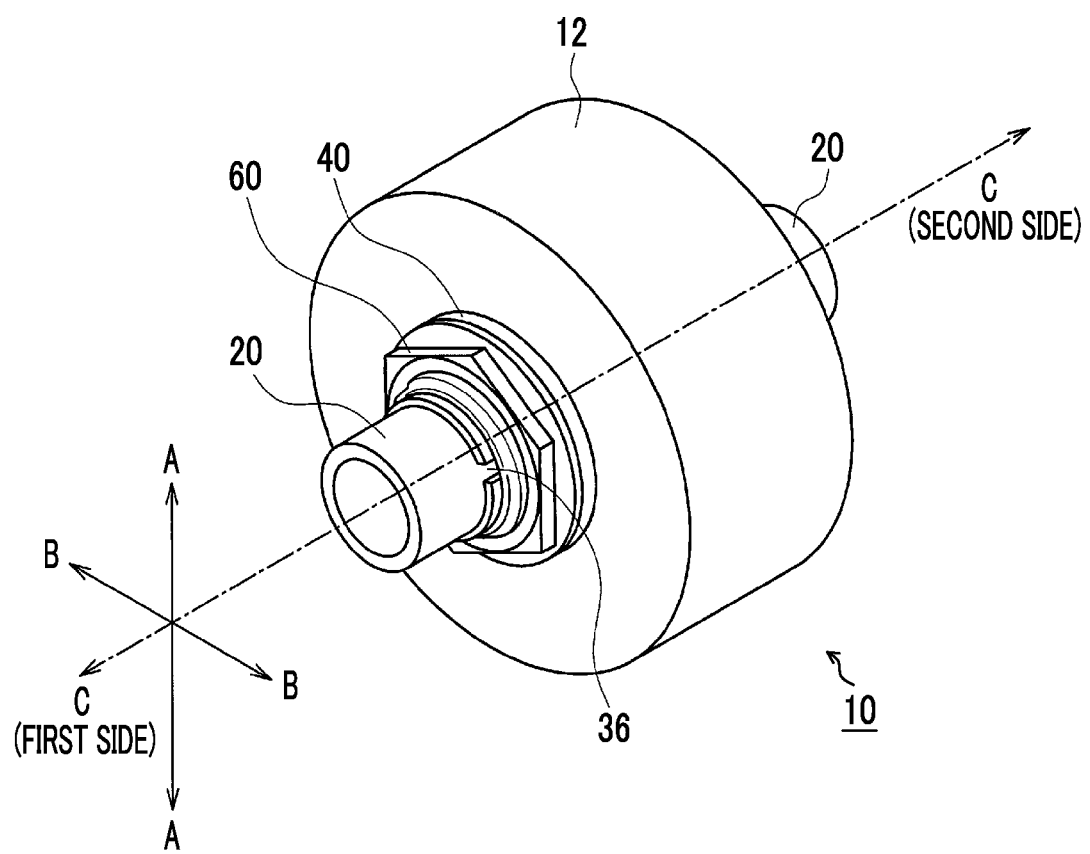
FIG. 1 is a perspective view of a rotary electric rotor according to an embodiment.

FIG. 1 is a perspective view illustrating a configuration of a rotary electric rotor 10 used in a rotary electric machine mounted in a vehicle. Hereinafter, unless otherwise stated, the rotary electric rotor 10 will be called the rotor 10. The rotary electric machine using the rotor 10 is a three-phase synchronous rotary electric machine, that is, a motor generator that functions as an electric motor when a vehicle is in powering and functions as an electric power generator while the vehicle is at a stop. The rotary electric machine is configured to have the rotor 10, which is illustrated in FIG. 1, and an annular stator which is disposed a predetermined gap distant from the outer circumferential side of the rotor 10 and around which a winding coil is wound. In FIG. 1, the stator is not illustrated.

The rotor 10 includes a rotor core assembly 12, a rotor shaft 20, a washer 40, and a nut 60. FIG. 1 illustrates an A-A direction, a B-B direction, and a C-C direction as three directions orthogonal to each other. The A-A direction is a vertical direction in the sheet. The B-B direction is a direction from the near-at-hand side toward the opposite side in the sheet. The C-C direction is an axial direction of the rotor 10. The nut 60 side in the axial direction of the rotor 10 will be called a first side, and the opposite side in the axial direction of the rotor 10 will be called a second side.

Figure 2:
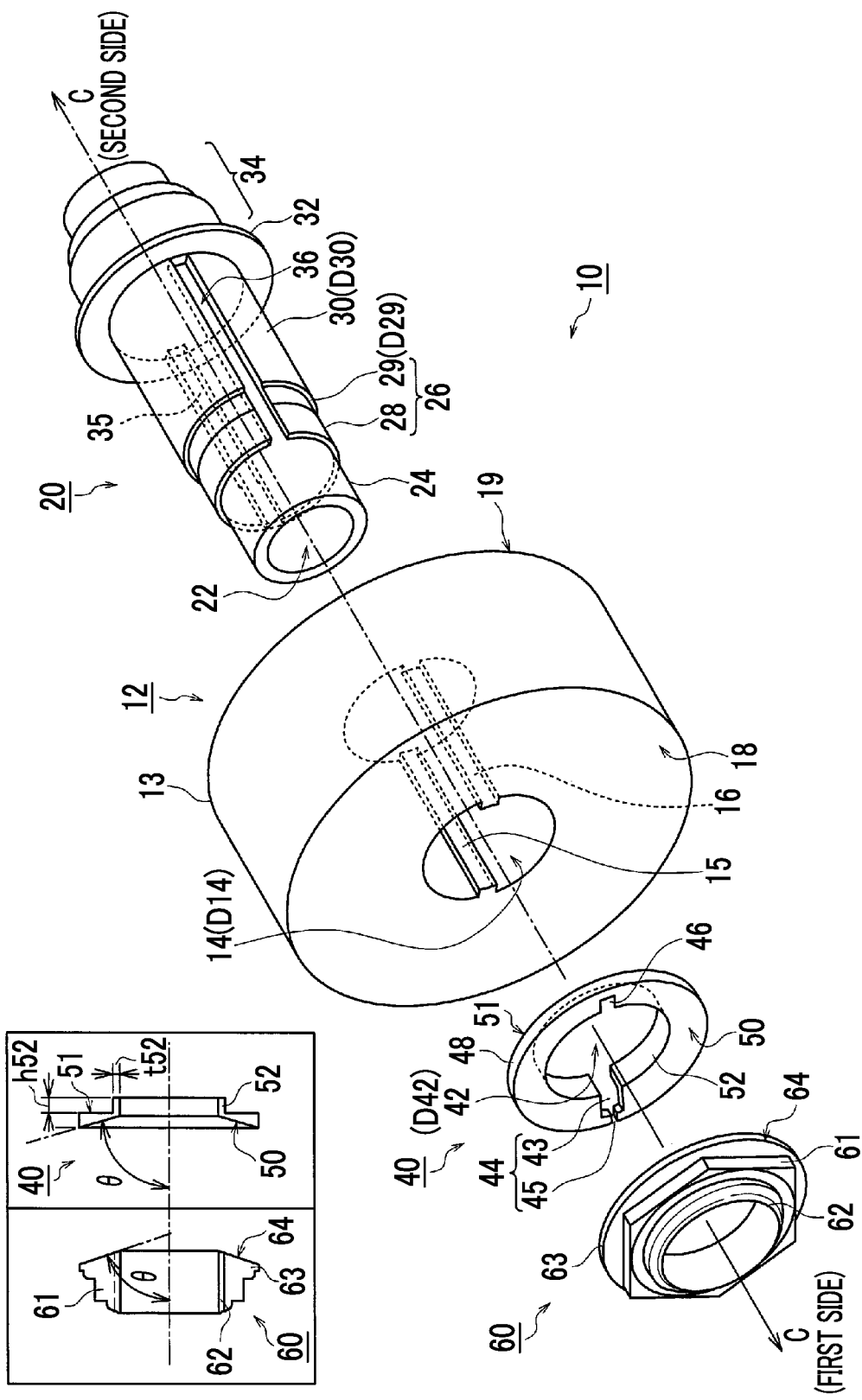
FIG. 2 is an exploded view of FIG. 1.

FIG. 2 is an exploded view of the rotor 10. Along the C-C direction, the rotor core assembly 12 is interposed between the rotor shaft 20 illustrated on the second side, and the washer 40 and the nut 60 illustrated side by side on the first side. In addition, at the upper left in FIG. 2, a sectional view of the washer 40 taken along the A-A direction and a sectional view of the nut 60 taken along the A-A direction are illustrated side by side.

The rotor core assembly 12 is configured to include a rotor core main body 13 in which a predetermined number of sheets of thin magnetic plates are layered and which has a shaft through-hole 14 allowing the rotor shaft 20 to pass through, and a plurality of magnets that is embedded and disposed in the rotor core main body 13. In FIG. 1 and thereafter, the magnets are not illustrated, so that the external shape of the rotor core assembly 12 is substantially the same as that of the rotor core main body 13. Hereinafter, unless otherwise stated, the rotor core assembly 12 will be called a rotor core 12. In place of the layered body with the thin magnetic plates, the rotor core main body 13 may be an integrated core obtained through magnetic powder forming.

The inner diameter of the shaft through-hole 14 of the rotor core 12 will be called D14. Hereinafter, inner diameters of the hole and outer diameters of the shaft regarded as principal sizes will be expressed as "D+(the reference sign of the hole or the shaft)". For example, the outer diameter of a main shaft portion 30 of the rotor shaft 20 is D30. The inner diameter D14 is greater than the outer diameter D30. The size difference between D14 and D30 is related to clearance fitting performed at a normal temperature. As an example, the size D14 is set to be greater than the outer diameter D30 within a range approximately from 0.05 mm to 0.10 mm. Through the size setting performed at a normal temperature, the rotor shaft 20 can be inserted and disposed in the shaft through-hole 14 of the rotor core 12 with no particular pushing force.

The inner circumferential surface of the shaft through-hole 14 is provided with locating portions 15, 16 extending in the axial direction of the rotor 10. The locating portions 15, 16 are protruding portions that are respectively fitted in cutouts 44, 46 of an annular projection portion 52 of the washer 40 and prevent the washer 40 from corotating along with rotation for fastening the nut 60 (refer to FIG. 6). The locating portions 15, 16 are respectively provided at two positions facing each other in a crossing direction of the inner diameter of the shaft through-hole 14. This configuration is an example, and one locating portion may be provided depending on the circumstances.

An end surface 18 of the rotor core 12 on the first side is a washer abutment surface to which an end surface of the washer 40 on the second side is pressed. An end surface 19 of the rotor core 12 on the second side is a receiving portion abutment surface that is received by an end surface of a core receiving portion 32 of the rotor shaft 20 on the first side.

The rotor shaft 20 is a shaft member extending in its axial direction. The rotor shaft 20 has a male screw portion 28 on the first side in the axial direction of the rotor shaft 20 and has steps of the core receiving portion 32 on the second side. An outer diameter D32 of the core receiving portion 32 is greater than the inner diameter D14 of the shaft through-hole 14 of the rotor core 12 and is smaller than an outer diameter D13 of the rotor core main body 13 (D14<D32<D13). The core receiving portion 32 functions as a receiver that stops the rotor core 12 from moving to the second side when the rotor shaft 20 is inserted into the shaft through-hole 14 of the rotor core 12 from the first side of the rotor shaft 20 and the nut 60 meshes with the male screw portion 28 on the first side via the washer 40. The surface area of the end surface of the core receiving portion 32 on the first side is set based on the receiving area that can sufficiently receive predetermined fastening force of the nut 60 when the end surface 19 of the rotor core 12 on the second side abuts the core receiving portion 32 and is fastened by the fastening force.

The first side beyond the core receiving portion 32 of the rotor shaft 20 along its axial direction is configured to be provided with a tip shaft portion 24, an intermediate shaft portion 26, and the main shaft portion 30 respectively having external shapes different from each other. An outer diameter D24 of the tip shaft portion 24, an outer diameter D26 of the intermediate shaft portion 26, and the outer diameter D30 of the main shaft portion 30 have a size relationship of D24<D26<D30. The intermediate shaft portion 26 is configured to have the male screw portion 28 and a shaft portion 29 on which no male screw is grooved. The outer diameter of the shaft portion 29 is expressed as D29 (=D26). The diameter of the screw thread of the male screw portion 28 is D29. The annular projection portion 52 of the washer 40 is disposed in a gap between the inner diameter D14 of the shaft through-hole 14 of the rotor core 12 and the outer diameter D29 of the shaft portion 29. The detailed description will be given later.

The second side beyond the core receiving portion 32 of the rotor shaft 20 along its axial direction is configured to be a stepped shaft portion 34 of which the outer diameter is gradually reduced. A shaft center hole 22 of the rotor shaft 20 is a hole in which a rotor output shaft (not illustrated) is fixed.

The intermediate shaft portion 26 of the rotor shaft 20 and the outer circumferential surface of the main shaft portion 30 are each provided with the groove portions 35, 36 extending in the axial direction of the rotor shaft 20. The groove portions 35, 36 respectively match the locating portions 15, 16 provided in the shaft through-hole 14 of the rotor core 12. The groove portions 35, 36 function as guides for the locating portions 15, 16 when the rotor shaft 20 is inserted into the shaft through-hole 14 of the rotor core 12. The outer diameter of the rotor shaft 20 at the groove bottoms of the groove portions 35, 36 is smaller than the inner diameter of the rotor core 12 at the tips of the protruding portions of the locating portions 15, 16.

The washer 40 has a washer center hole 42 allowing the first side in the axial direction of the rotor shaft 20 to pass through. The washer 40 is different from an ordinary ring-shaped washer having a uniform plate thickness. The washer 40 is a member having an annular structure with the two cutouts 44, 46 along a circumferential direction of the washer 40. The cutout 44 has a split cutout structure in which the cutout 44 leads from a wide cutout 43 on the washer center hole 42 side to a narrow cutout 45 disposed radially outward from the washer center hole 42 side, and a part of the washer 40 in its circumferential direction is cut out from an inner circumferential end to an outer circumferential end. The cutout 46 is provided at a position facing the cutout 44 halfway around the washer 40 along its circumferential direction. The cutout 46 is a wide cutout disposed radially inward to the washer center hole 42 side. The cutout 46 is a partial cutout, so that the washer 40 is continuous along its circumferential direction at the outer circumferential end. Due to the annular structure having the cutouts 44, 46, the washer 40 is elastically deformable in a radial direction. For example, when external force is added to the outer circumferential side of the washer 40, the washer 40 is radially reduced in size, so that an inner diameter D42 of the washer center hole 42 can be reduced. When the external force is eliminated, the washer center hole 42 regains the original inner diameter D42.

The locating portions 15, 16 of the rotor core 12 are respectively disposed in the wide cutout 43 and the cutout 46. Accordingly, the washer 40 and the nut 60 are prevented from corotating when the nut 60 is fastened (refer to FIG. 6).

The washer 40 includes a washer flange portion 48 having the washer center hole 42, and the annular projection portion 52 extending from an end surface 51 of the washer flange portion 48 on the second side along the axial direction of the rotor shaft 20 by a predetermined protruding amount h52. The washer flange portion 48 and the annular projection portion 52 are elastically deformable in the radial direction due to the cutouts 44, 46 in the annular structure.

The end surface of the washer flange portion 48 on the first side is a washer tapered surface 50 that inclines toward the rotor core 12 side with respect to the axial direction at a predetermined inclination angle θ. Due to having the inclination angle θ, when the washer 40 is assembled in the rotor core 12, the washer tapered surface 50 extends radially outward to a side that is the opposite side of the washer 40 in contact with the rotor core 12. The predetermined inclination angle θ is an acute angle. A method of setting the inclination angle will be described later.

The annular projection portion 52 has an inner diameter that is the same as the inner diameter D42 of the washer center hole 42. The annular projection portion 52 has the thickness t52 that is uniform in the radial direction. Therefore, an outer diameter D52 of the annular projection portion 52 has a value of "D42+2×(t52)". Due to the annular structure of the washer 40, the annular projection portion 52 is also elastically deformable in the radial direction. For example, when external force is added to the outer circumferential side of the washer 40, the washer 40 is radially reduced in size, so that the inner diameter D42 and the outer diameter D52 of the annular projection portion 52 can be reduced. When the external force is eliminated, the annular projection portion 52 regains the original shape. Due to utilizing the elastic deformation, it is possible to radially reduce the annular projection portion 52 and to dispose the annular projection portion 52 of the washer 40 in the gap between the inner circumferential surface of the shaft through-hole 14 of the rotor core 12 and the outer circumferential surface of the shaft portion 29 of the intermediate shaft portion 26 of the rotor shaft 20. Thereafter, the annular projection portion 52 radially expands, so that the washer 40 and the rotor core 12 can be fixed to each other. The detailed description will be given later.

The nut 60 is a fastening member that has a female screw portion 62 and causes the female screw portion 62 to mesh with the male screw portion 28 of the rotor shaft 20, thereby fastening the rotor core 12 and the rotor shaft 20 together.

The nut 60 includes a head portion 61 having the female screw portion 62, and a nut flange portion 63 having a diameter greater than that of the head portion 61. The end surface of the nut flange portion 63 on the second side is a nut tapered surface 64 having the predetermined inclination angle θ and is disposed so as to face the washer tapered surface 50 having the same inclination angle θ. Due to having the inclination angle θ, when the nut 60 is assembled in the rotor core 12 together with the washer 40, the nut tapered surface 64 extends radially inward to the washer 40 side.

Figure 3:
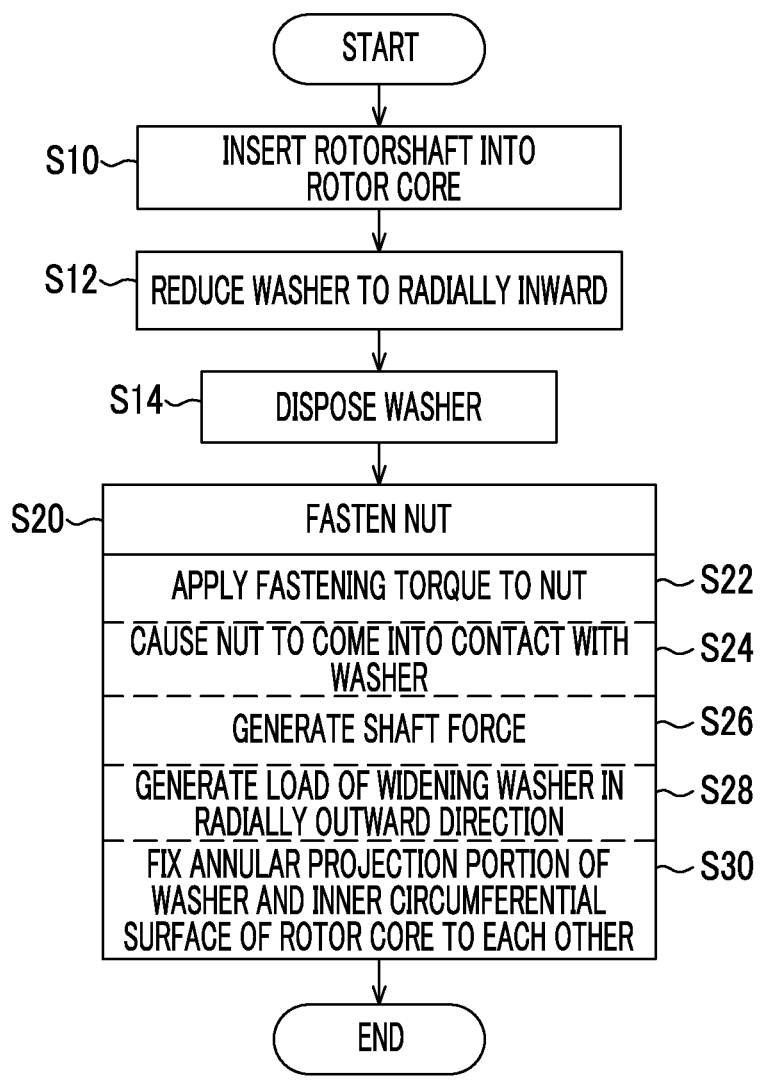
FIG. 3 is a flowchart illustrating a procedure of a method of manufacturing a rotary electric rotor according to the embodiment.

FIG. 3 is a flowchart illustrating a procedure of a method of manufacturing the rotary electric rotor 10 according to the embodiment. First, a step of inserting a rotor shaft is performed. In the step, the rotor shaft 20 is inserted into the rotor core 12 (S10). The rotor shaft 20 has the male screw portion 28 on the first side in the axial direction of the rotor core 12 and has the core receiving portion 32 on the second side in the axial direction of the rotor core 12, so that the rotor shaft 20 is inserted into the shaft through-hole 14 of the rotor core 12 from the first side in the axial direction of the rotor core 12 and the core receiving portion 32 receives the end surface 19 of the rotor core 12 on the second side. The main shaft portion 30 has the greatest outer diameter in the rotor shaft 20, and the outer diameter D30 of the main shaft portion 30 is smaller than the inner diameter D14 of the shaft through-hole 14 of the rotor core 12 within a range approximately from 0.05 mm to 0.10 mm at a normal temperature. Therefore, the rotor shaft 20 is inserted into the rotor core 12 with no particular pushing force.

In the shaft through-hole 14 of the rotor core 12, the protruding portions of the locating portions 15, 16 extend in the axial direction of the rotor core 12. Since the inner diameter of the rotor core 12 at the tips of the protruding portions of the locating portions 15, 16 is greater than the outer diameter D30 of the main shaft portion 30, the groove portions 35, 36 are provided in the rotor shaft 20 so as to respectively match the locating portions 15, 16. Thus, while the rotor shaft 20 is guided such that the locating portions 15, 16 respectively fit the groove portions 35, 36 of the rotor shaft 20, the rotor shaft 20 is inserted into the shaft through-hole 14 of the rotor core 12.

Figure 4:
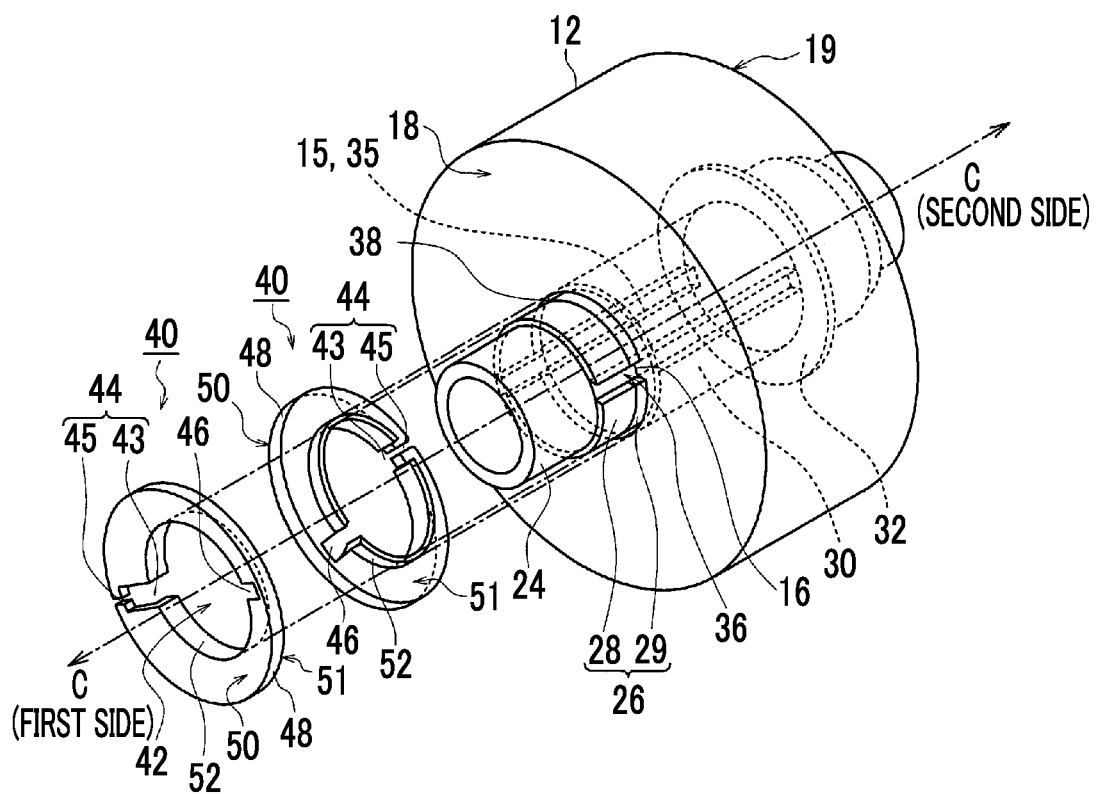
FIG. 4 is a perspective view illustrating a step of disposing a washer in the method of manufacturing a rotary electric rotor according to the embodiment.

FIG. 4 illustrates a state where the rotor shaft 20 is inserted into the rotor core 12, and the end surface 19 of the rotor core 12 on the second side abuts the core receiving portion 32 of the rotor shaft 20.

Returning to FIG. 3, when the step of S10 ends, subsequently, external force is added to the washer 40, and the washer 40 is radially reduced in size (S12). Then, the annular projection portion 52 of the washer 40 that is in a state of being radially reduced is size is disposed in a gap 38 between the inner circumferential surface of the shaft through-hole 14 of the rotor core 12 and the outer circumferential surface of the shaft portion 29 of the intermediate shaft portion 26 of the rotor shaft 20 (S14). After the annular projection portion 52 is disposed in the gap 38, the external force is eliminated.

FIG. 4 illustrates the washer tapered surface 50 that is the end surface of the washer flange portion 48 on the first side. FIG. 4 illustrates the end surface 51 of the washer flange portion 48 on the second side. The annular projection portion 52 protrudes from the end surface 51 of the washer flange portion 48 on the second side.

Figure 5:
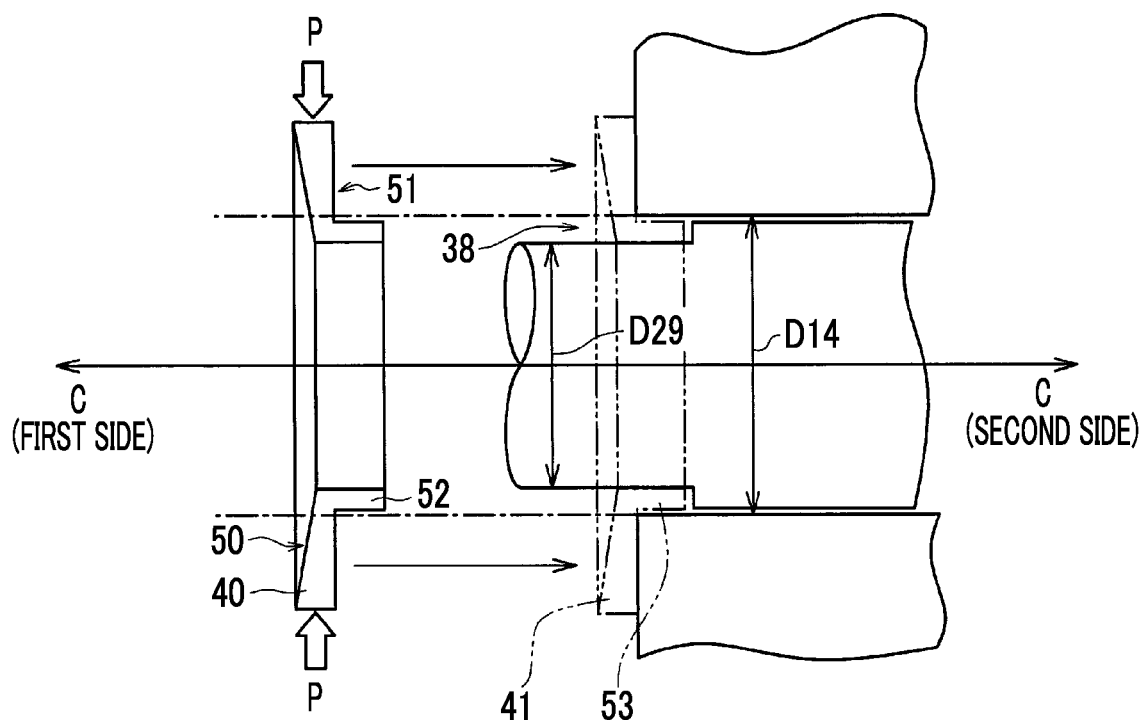
FIG. 5 is a view illustrating detailed disposition of the washer in FIG. 4.

FIG. 5 illustrates a sectional view related to the washer 40, the rotor core 12, and the shaft portion 29 of the rotor shaft 20. The size difference between the inner diameter D14 of the shaft through-hole 14 of the rotor core 12 and the outer diameter D29 of the shaft portion 29 of the rotor shaft 20 is set such that a clearance ranging from approximately 0.05 mm to approximately 0.10 mm is generated in addition to twice the radial thickness (t52) of the annular projection portion 52. Therefore, when the elastic deformation caused due to the cutouts of the washer 40 is utilized, and the outer diameter and the inner diameter of the annular projection portion 52 are suitably adjusted, the annular projection portion 52 can be disposed in the gap 38 between the inner circumferential surface of the shaft through-hole 14 of the rotor core 12 and the outer circumferential surface of the shaft portion 29 of the rotor shaft 20. In FIG. 5, the solid line indicates a state where external force P is applied to the washer 40, and the two-dot chain line indicates a washer 41 and an annular projection portion 53 of the washer 41 that is radially reduced in size by the external force P and is disposed in the gap 38.

Figure 6:
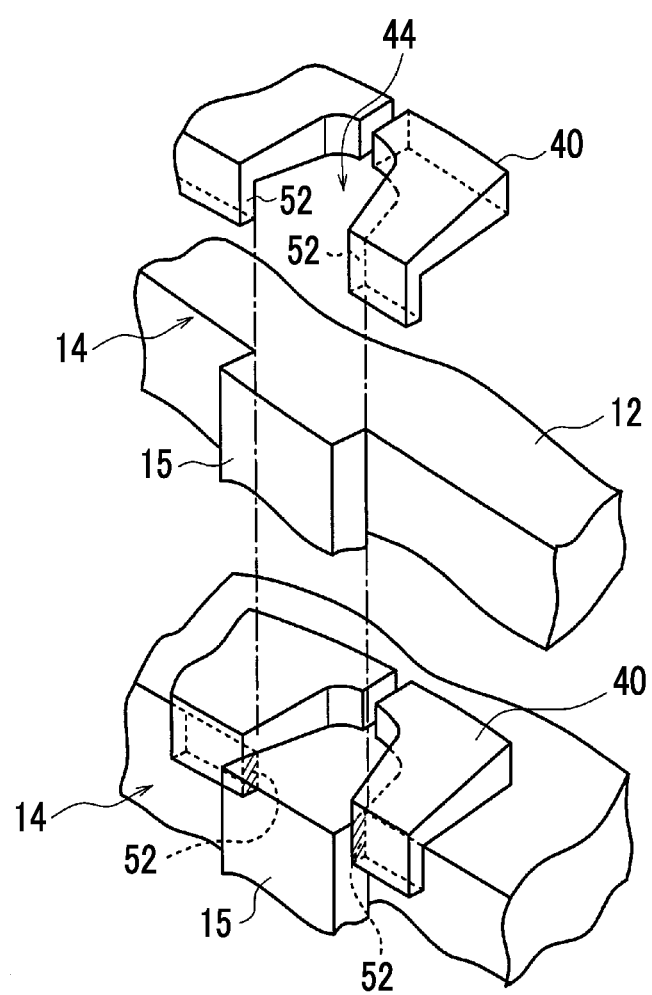
FIG. 6 is a view illustrating a detailed relationship between a locating portion of a rotor core and a cutout of the washer in FIG. 4.

FIG. 6 is a view illustrating a detailed relationship between the locating portion 15 of the rotor core 12 and the cutout 44 of the washer 40. At the top in FIG. 6, the annular projection portion 52 on the cutout 44 side is illustrated in a partial perspective view of the cutout 44 of the washer 40. In the middle of FIG. 6, the locating portion 15 protruding radially inward from the inner circumferential surface of the shaft through-hole 14 is illustrated in a perspective view of the locating portion 15 of the rotor core 12. At the bottom in FIG. 6, a state where the annular projection portion 52 of the washer 40 is disposed in the locating portion 15 of the rotor core 12 is illustrated. In this state, side surfaces of the locating portion 15 abut the annular projection portion 52 of the washer 40 on the cutout 44 side. Accordingly, even though the nut 60 rotates and is fastened, movement of the washer 40 is restricted due to the side surfaces of the annular projection portion 52 on the cutout 44 side abutting the locating portion 15 of the rotor core 12, so that the nut 60 and the washer 40 are prevented from corotating. The cutout 46 and the locating portion 16 have a similar relationship.

Returning to FIG. 3, when a step of disposing the washer 40 ends, subsequently, the nut 60 is fastened (S20). As illustrated in FIG. 2, both the washer tapered surface 50 of the washer 40 and the nut tapered surface 64 of the nut 60 incline toward the rotor core 12 side with respect to the axial direction at the predetermined inclination angle θ. That is, the nut 60 presses the washer 40 with the surface inclining at the inclination angle θ.

Figure 7:
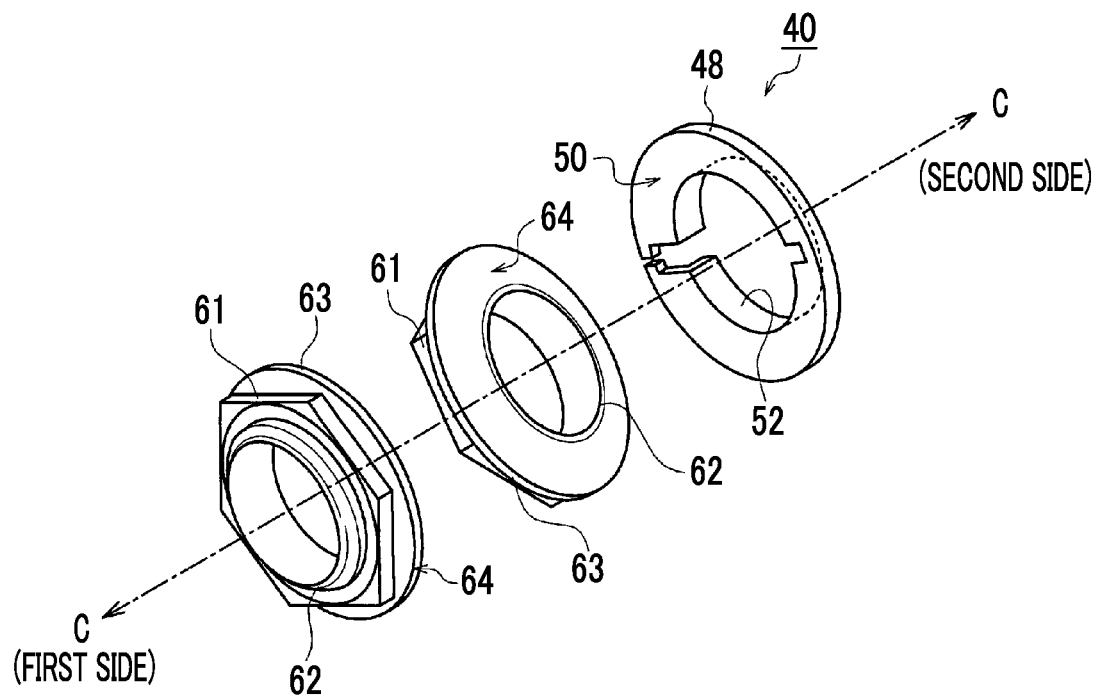
FIG. 7 is a perspective view illustrating a disposition relationship between the washer and a nut in the method of manufacturing a rotary electric rotor according to the embodiment.

FIG. 7 is a perspective view illustrating a disposition relationship between the washer 40 and the nut 60 in a process of the method of manufacturing the rotor 10. In sequence from the second side, a perspective view of the washer 40, a view that is a reversely turned perspective view of the nut 60, and the perspective view of the nut 60 are illustrated side by side. The perspective view of the washer 40 illustrates the washer tapered surface 50 that is the end surface of the washer flange portion 48 on the first side. The perspective view of the nut 60 illustrates the head portion 61 provided on the first side of the nut flange portion 63. The view that is a reversely turned perspective view of the nut 60 illustrates the nut tapered surface 64 that is the end surface of the nut flange portion 63 on the second side. Since the inclination angle θ of the washer tapered surface 50 is the same as the inclination angle θ of the nut tapered surface 64, the nut 60 presses the washer tapered surface 50 with the nut tapered surface 64.

Figure 8:
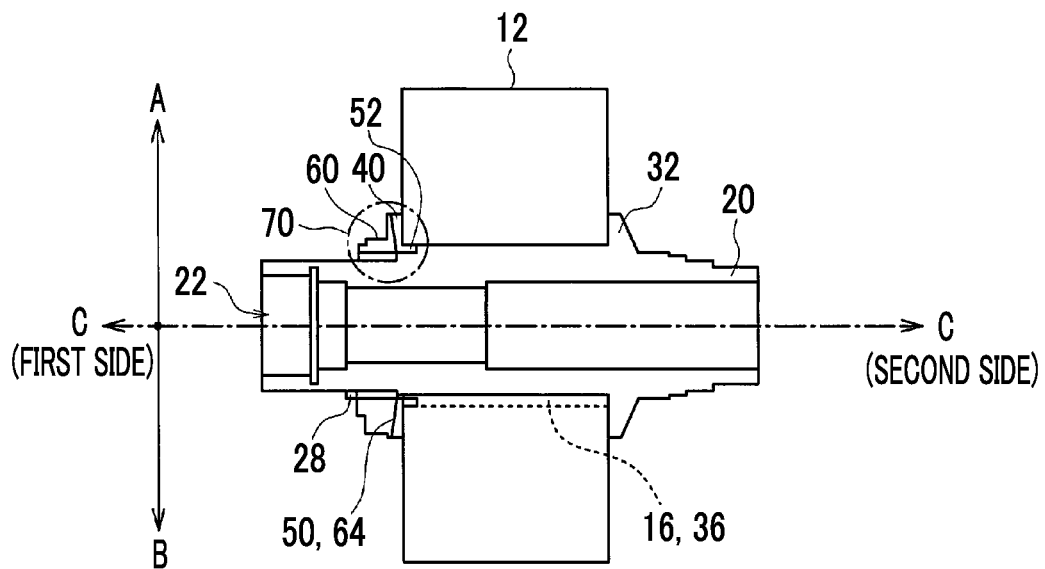
FIG. 8 is a sectional view of the rotary electric rotor which has been assembled through the method of manufacturing a rotary electric rotor according to the embodiment.

When the nut 60 is fastened, the rotary electric rotor 10 illustrated in FIG. 1 is obtained. FIG. 8 is a sectional view of the rotary electric rotor 10 in FIG. 1. In FIG. 8 having the C-C direction as the centerline, a sectional view taken along the A-A direction is illustrated on the upper side of the sheet, and a sectional view taken along the B-B direction, which is a direction including the locating portion 16 and the groove portion 36, is illustrated on the lower side of the sheet. As illustrated in FIG. 8, the washer 40 having the annular projection portion 52 and the nut 60 having the nut tapered surface 64 inclined at the inclination angle θ in the same manner as the washer tapered surface 50 of the washer 40 are used, so that the rotor core 12 and the rotor shaft 20 are fixed to each other at a normal temperature.

Figure 9:
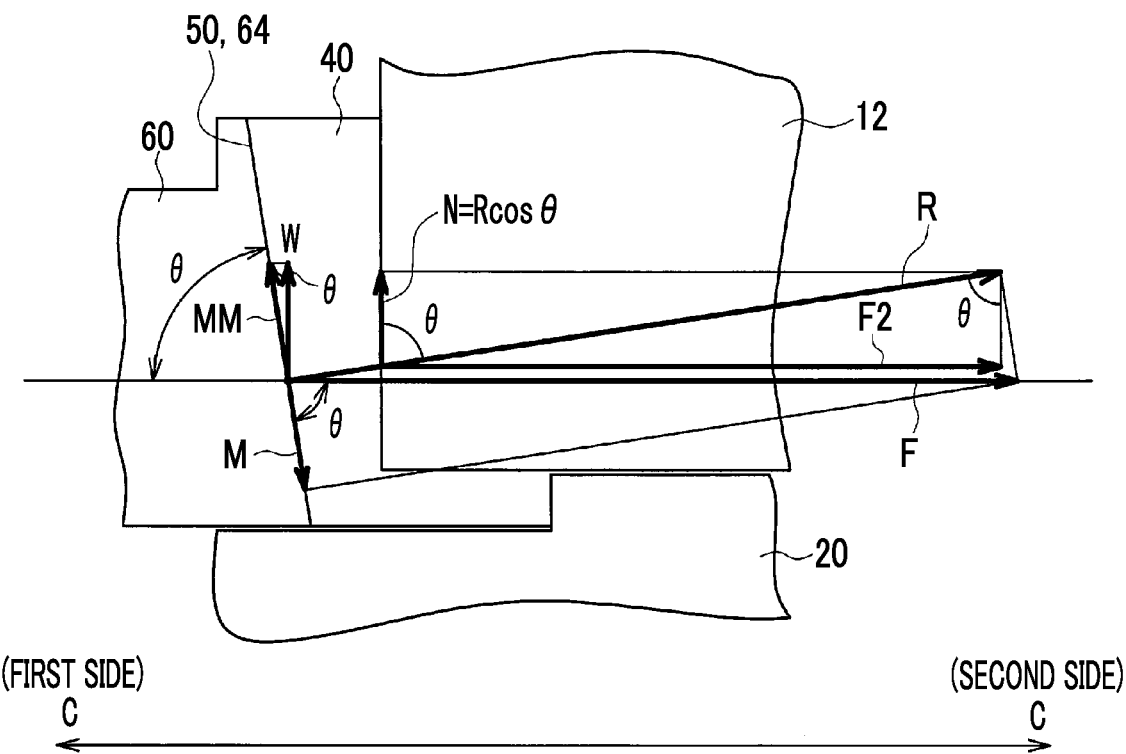
FIG. 9 is a force balance view illustrating a relationship and the like between fastening force of the nut and centrifugal force of the rotor in the rotary electric rotor according to the embodiment.

The rotor core 12 and the rotor shaft 20 are fixed to each other after several stages while fastening the nut 60 proceeds. In FIG. 3, "nut fastening" (S20) divided into five stages is illustrated. The content of each stage will be described by using FIG. 9 illustrating a force balance between the washer tapered surface 50 and the nut tapered surface 64. FIG. 9 is an enlarged view of a part 70 in FIG. 8.

A first stage of "nut fastening" (S20) is a stage where fastening torque is applied to the nut 60 (S22). Specifically, the female screw portion 62 of the nut 60 meshes with the male screw portion 28 of the rotor shaft 20, and a fastening tool or the like is used so as to rotate the head portion 61 in a fastening direction. When the nut fastening proceeds, as a second stage, the nut tapered surface 64 of the nut 60 comes into contact with the washer tapered surface 50 of the washer 40 (S24). FIG. 9 illustrates the state. When the nut tapered surface 64 has come into contact with the washer tapered surface 50, as a third stage, shaft force F is generated based on fastening torque of the nut 60 (S26). The direction of the shaft force F is parallel to an axis-directional C-C direction.

The shaft force F is divided into a surface pressure component R perpendicular to the nut tapered surface 64 and the washer tapered surface 50, and a component M parallel to the nut tapered surface 64 and the washer tapered surface 50. The component M is a force component that pushes the nut 60 and the washer 40 radially inward, thereby being called pushing force M.

When fastening the nut 60 further proceeds, as a fourth stage, a load of widening the washer 40 in an outer circumferential direction is generated (S28). The surface pressure component R that has diverged from the shaft force F diverges as a force component on the end surface 18 of the rotor core 12 on the first side. The force component on the end surface 18 of the rotor core 12 on the first side diverges into a component parallel to the axis-directional C-C direction (F2=R sin θ) and a component parallel to the end surface 18 (Rcos θ). The component parallel to the end surface 18 is a load that tends to widen the washer 40 in the outer circumferential direction (N=Rcos θ).

As a fifth stage, due to the load (N=R cos θ), the annular projection portion 52 of the washer 40 presses the inner circumferential surface of the shaft through-hole 14 of the rotor core 12. Accordingly, the washer 40 and the rotor core 12 are fixed (S30).

That is, the nut 60 is fixed to the rotor shaft 20 by a screw mechanism. The nut 60 fixes the washer 40 by pressing the washer 40. The annular projection portion 52 is widened radially outward, so that the washer 40 is fixed to the rotor core 12. Accordingly, the rotor core 12 and the rotor shaft 20 can be fixed to each other at a normal temperature.

Subsequently, the inclination angle θ is set as follows. Centrifugal force W caused due to an imbalance in the rotor 10 is generated in a direction perpendicular to the axis-directional C-C direction. FIG. 9 illustrates the centrifugal force W. A component of the centrifugal force W parallel to the nut tapered surface 64 and the washer tapered surface 50 (MM=W sin θ) becomes a shearing-out load of the nut 60. Since the pushing force (M=F cos θ) described in the third stage is a force component pushing the nut 60 radially inward, when the inclination angle θ is set such that the shearing out load (MM=W sin θ) caused by the centrifugal force becomes smaller than the pushing force (M=F cos θ), the nut 60 is not loosened. The expression (M=F cos θ)>(MM=W sin θ) indicates the relationship. In other words, the relationship of "tan θ<(F/W)" is established. The greater the centrifugal force W becomes due to the designed specification when the shaft force F is applied, the smaller the inclination angle θ is set. Reducing the inclination angle θ denotes reducing the allowance of the washer 40 in a thickness direction, that is, a range of extending toward the nut 60 side.

Figure 10A:
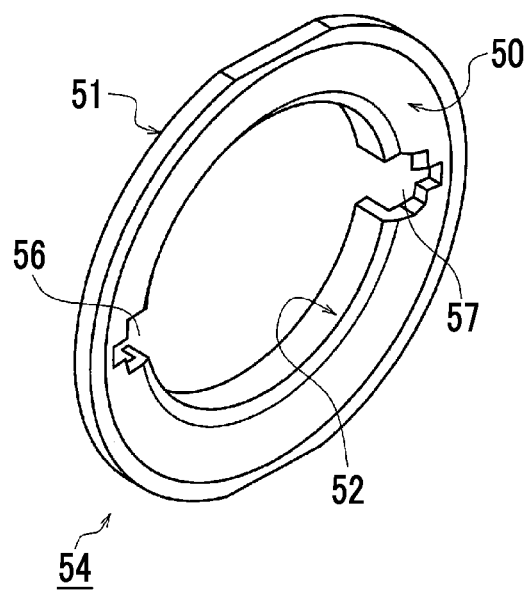
FIG. 10A is a perspective view illustrating an example of a different washer, and the view illustrates a washer tapered surface side.
Figure 10B:
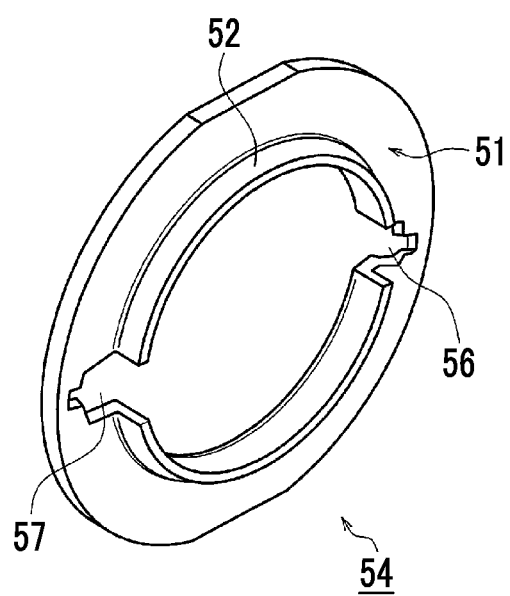
FIG. 10B is a perspective view illustrating the example of the different washer, and the view illustrates an annular projection portion side.

In the description above, the annular structure of the washer 40 has the two cutouts 44, 46 along the circumferential direction of the washer 40. The cutout 44 has a split cutout structure in which a part of the washer 40 in its circumferential direction is cut out from the inner circumferential end to the outer circumferential end. The cutout 46 is a partial cutout, so that the washer 40 is continuous at the outer circumferential end along the circumferential direction of the washer 40. FIGS. 10A and 10B are perspective views illustrating an example of a different washer 54. FIG. 10A is a view illustrating the washer tapered surface 50 side. FIG. 10B is a view illustrating the annular projection portion 52 side. The washer 54 has two cutouts 56, 57. The cutouts 56, 57 have the same shapes as each other. Both the cutouts 56, 57 are partial cutouts, so that the washer 54 is continuous along its circumferential direction at the outer circumferential end.

Compared to the washer 40 having the split structure, the washer 54 has high rigidity related to elastic deformation in the radial direction. Therefore, the annular projection portion 52 of the washer 54 can have increased force of pressing the inner circumferential surface of the shaft through-hole 14 of the rotor core 12, that is, increased force of fixing the washer 54 to the rotor core 12 compared to the washer 40 having the split structure.

Figure 11A:
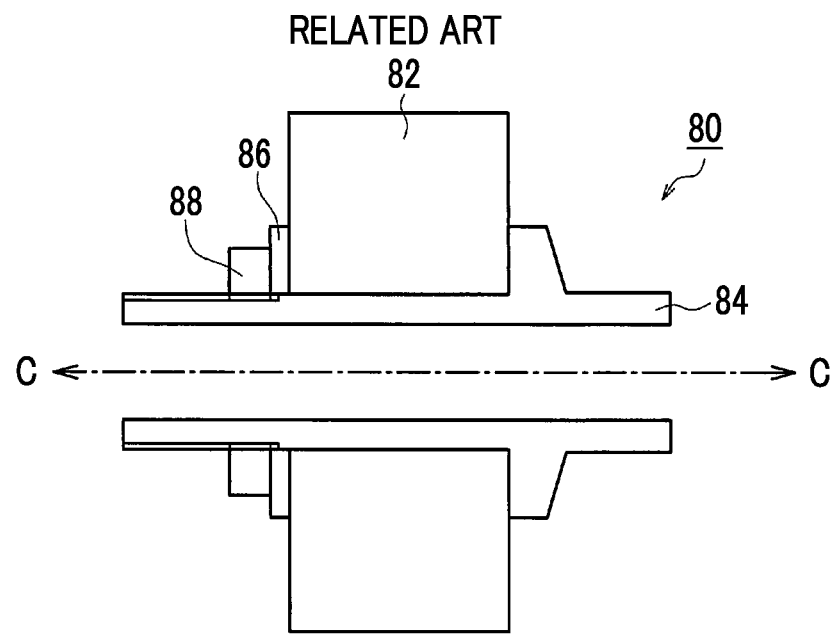
FIG. 11A is a sectional view comparing the operation effect of the rotary electric rotor of the embodiment to that in a related technology, and the view illustrates a nut fastening method in which clearance management is performed.
Figure 11B:
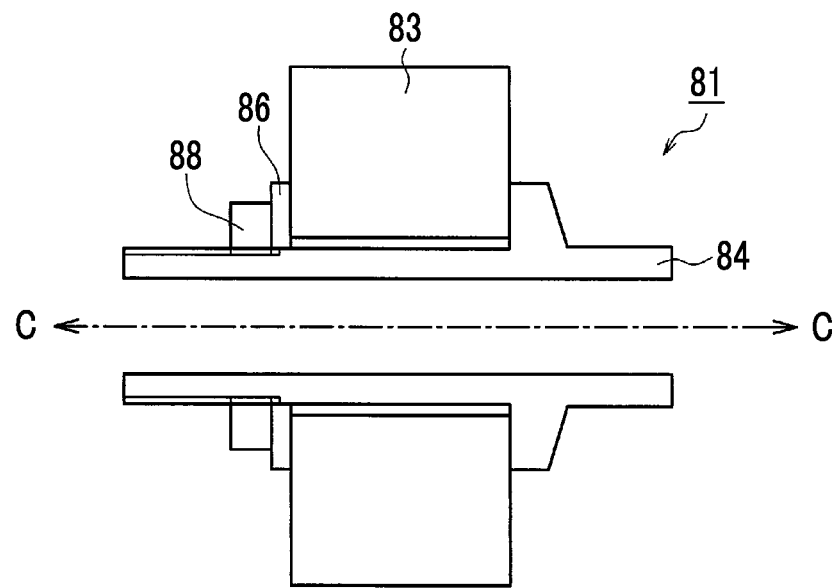
FIG. 11B is a sectional view comparing the operation effect of the rotary electric rotor of the embodiment to that in a related technology, and the view illustrates an example in which assembling is performed at a normal temperature.
Figure 11C:
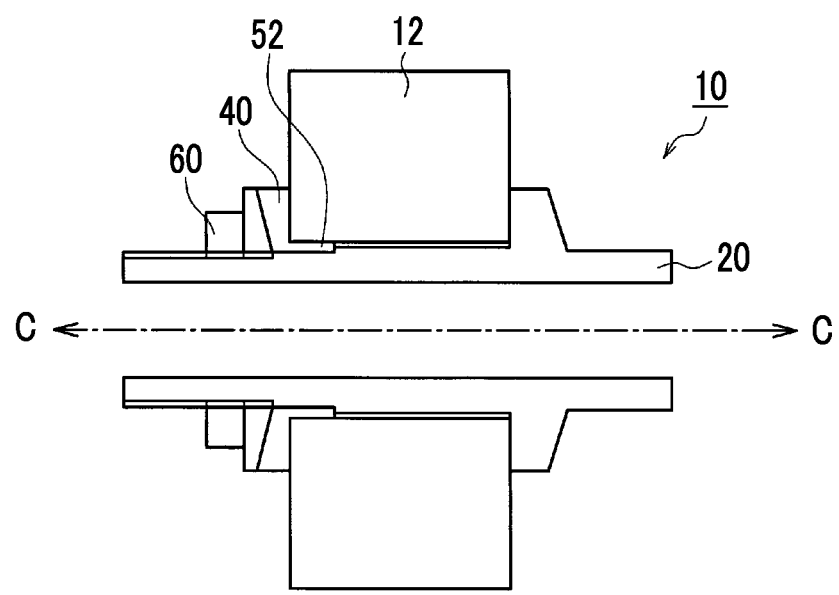
FIG. 11C is a sectional view comparing the operation effect of the rotary electric rotor of the embodiment to that in a related technology, and the view illustrates the method of the embodiment.

An operation effect of the rotor 10 in the embodiment will be described based on a comparison with a related technology by using FIGS. 11A to 11C. FIGS. 11A to 11C are sectional views illustrating four elements such as a rotor core, a rotor shaft, a washer, and a nut that are narrowed as configuration elements of a rotor. FIGS. 11A to 11C illustrate the differences among the configurations.

A rotor 80 in FIG. 11A employs a method of a related technology in which clearance management for a clearance between a shaft through-hole of a rotor core 82 and a rotor shaft 84 is performed, and a nut 88 fastens the rotor core 82 and the rotor shaft 84 together via a washer 86. The method has disadvantages that strict clearance management is incidental and nut looseness can occur.

A rotor 81 in FIG. 11B employs a method in which a clearance between a shaft through-hole of a rotor core 83 and a rotor shaft 84 is subjected to clearance fitting, assembling is performed at a normal temperature, and a nut 88 fastens the rotor core 83 and the rotor shaft 84 together via a washer 86. The method has disadvantages that the clearance between the rotor shaft 84 and the shaft through-hole of the rotor core 83 is significant and the rotor core 83 can move in the radial direction.

FIG. 11C is a view illustrating the rotor 10 according to the embodiment. A clearance between the shaft through-hole of the rotor core 12 and the rotor shaft 20 is subjected to the clearance fitting. Assembling can be performed at a normal temperature. The washer 40 has the annular projection portion 52. The annular projection portion 52 functions as a filler for clearance fitting, so that the rotor core 12 does not move in the radial direction. In addition, since the washer 40 and the nut 60 are in contact with each other through their tapered surfaces, when the washer 40 is fastened, the annular projection portion 52 of the washer 40 is widened in its outer circumferential direction. Accordingly, the washer 40 and the rotor core 12 are fixed to each other.

The rotary electric rotor 10 according to the embodiment includes the rotor core 12 and the rotor shaft 20. The rotor core 12 has the shaft through-hole 14. The rotor shaft 20 has the male screw portion 28 on the first side in the axial direction of the rotor shaft 20 and has the core receiving portion 32 on the second side in the axial direction of the rotor shaft 20. Moreover, the rotary electric rotor 10 includes the washer 40 having the annular structure. The annular structure has the cutouts configured to cause the washer 40 to be elastically deformable in the radial direction. The washer 40 includes the washer flange portion 48 having the washer tapered surface 50 that is a surface on the opposite side of the washer 40 in contact with the rotor core 12. The washer tapered surface 50 extends radially outward to a side that is the opposite side of the washer 40 in contact with the rotor core 12. In addition, the washer 40 has the annular projection portion 52 extending in the axial direction of the rotor shaft 20 from the end surface 51 on a side that is the opposite side of the washer 40 having the washer tapered surface 50 of the washer flange portion 48. The annular projection portion 52 is disposed in the gap 38 between the inner circumferential surface of the shaft through-hole 14 of the rotor core 12 and the outer circumferential surface of the rotor shaft 20. The annular projection portion 52 is fixed to the rotor core 12 in a state of pressing the inner circumferential surface of the shaft through-hole 14. In addition, the rotary electric rotor 10 includes the nut having the female screw portion 62 that meshes with the male screw portion 28 of the rotor shaft 20 and is fixed to the rotor shaft 20. The end surface of the nut facing the washer tapered surface 50 is the nut tapered surface 64 extending radially inward to the washer 40 side.

What is claimed is:

1. A rotary electric rotor comprising:
   a rotor shaft having a male screw portion on a first side in an axial direction of the rotor shaft and having a core receiving portion on a second side in the axial direction of the rotor shaft;
   a rotor core having a shaft through-hole for the rotor shaft, in which the rotor shaft is inserted into the shaft through-hole of the rotor core, and one end portion of the rotor core is in contact with the core receiving portion of the rotor shaft;
   a washer having an annular structure, in which the washer has cutouts configured to cause the washer to be elastically deformable in a radial direction, the washer is disposed so as to be in direct contact with a second end surface of the rotor core, a surface on an opposite side of a surface of the washer in contact with the second end surface of the rotor core is a tapered surface of which a side disposed radially outward from the rotor shaft is configured to be farther from the second end surface of the rotor core than a side disposed radially inward to the rotor shaft, the surface of the washer in contact with the second end surface of the rotor core has an annular projection portion extending in the axial direction of the rotor shaft, the annular projection portion is positioned in a gap between an inner circumferential surface of the shaft through-hole of the rotor core and an outer circumferential surface of the rotor shaft, and the annular projection portion is fitted and fixed to the inner circumferential surface of the shaft through-hole of the rotor core,
   wherein the tapered surface of the washer is formed such that, when viewed in cross-section, a thickness of the washer decreases in a radially inward direction; and
   a nut having a female screw portion, meshing with and being fixed to the male screw portion of the rotor shaft, and having a first end surface in contact with the tapered surface of the washer, in which the first end surface of the nut is a tapered surface of which a side disposed radially inward to the rotor shaft protrudes closer to the washer side than a side disposed radially outward from the rotor shaft.

2. The rotary electric rotor according to claim 1, wherein an inner diameter of the rotor core is greater than an outer diameter of the rotor shaft.

3. The rotary electric rotor according to claim 1, wherein the annular structure of the washer is a split structure of which a part in a circumferential direction is cut out from an inner circumferential end to an outer circumferential end.

4. The rotary electric rotor according to claim 1, wherein the annular structure of the washer is a partial cutout structure of which a part in the circumferential direction is partially cut out in the radial direction such that the washer is continuous in the circumferential direction.

5. The rotary electric rotor according to claim 1, wherein a radial thickness of the annular projection portion is uniform along the axial direction of the rotor shaft.

6. The rotary electric rotor according to claim 1, wherein the rotor core has locating portions respectively matching the cutouts in the annular projection portion of the washer and protruding radially inward from the inner circumferential surface of the shaft through-hole.

7. The rotary electric rotor according to claim 1, wherein the tapered surface of the washer is set such that the greater centrifugal force, the smaller range for being farther from the second end surface of the rotor core in accordance with specification of the centrifugal force generated in the rotor core when the rotor shaft rotationally operates.

8. A method of manufacturing a rotary electric rotor, the method comprising:
   inserting a rotor shaft having a male screw portion on a first side in an axial direction of the rotor shaft and having a core receiving portion on a second side in the axial direction of the rotor shaft into a shaft through-hole of a rotor core from the first side in the axial direction of the rotor shaft, and receiving one end portion of the rotor core by the core receiving portion of the rotor shaft, as a step of inserting the rotor shaft;
   disposing an annular projection portion of a washer in a gap between an inner circumferential surface of the shaft through-hole and an outer circumferential surface of the rotor shaft on a second end surface of the rotor core, as a step of disposing the washer, the washer having an annular structure, the washer having cutouts configured to cause the washer to be elastically deformable in a radial direction, the annular projection portion of the washer extending in the axial direction of the rotor shaft from a surface in direct contact with the second end surface of the rotor core, and a surface on an opposite side of a surface of the washer in contact with the second end surface of the rotor core being a tapered surface of which a side disposed radially outward from the rotor shaft is configured to be farther from the second end surface of the rotor core than a side disposed radially inward to the rotor shaft, wherein the tapered surface of the washer is formed such that, when viewed in cross-section, a thickness of the washer decreases in a radially inward direction; and meshing a nut having a female screw portion to the male screw portion of the rotor shaft, as a step of fastening the nut, an end surface of the nut facing the tapered surface of the washer being a tapered surface of which a side disposed radially inward to the rotor shaft protrudes closer to the washer side than a side disposed radially outward from the rotor shaft, pressing the tapered surface of the nut to the tapered surface of the washer such that the annular projection portion of the washer is widened in an outer circumferential direction, the annular projection portion of the washer is pressed to the inner circumferential surface of the rotor core, and fixing the washer to the rotor core with the nut.

9. The method according to claim 8, wherein the step of inserting the rotor shaft is performed at a normal temperature.

10. The method according to claim 8, wherein in the step of disposing the washer, the washer is reduced radially inward such that the annular projection portion is reduced radially inward, and then, the annular projection portion is disposed in the gap between the inner circumferential surface of the shaft through-hole of the rotor core and the outer circumferential surface of the rotor shaft.

* * * * *